(12) United States Patent  
Sultan et al.

(10) Patent No.: US 7,969,888 B2  
(45) Date of Patent: Jun. 28, 2011

(54) DATA COMMUNICATIONS NETWORK FOR THE MANAGEMENT OF AN ETHERNET TRANSPORT NETWORK

(75) Inventors: Robert Sultan, Somers, NY (US); Linda Dunbar, Plano, TX (US); T. Benjamin Mack-Crane, Downers Grove, IL (US); Lucy Yong, Tulsa, OK (US)

(73) Assignee: Futurewei Technologies, Inc., Plano, TX (US)

( * ) Notice: Subject to any disclaimer, the term of this patent is extended or adjusted under 35 U.S.C. 154(b) by 217 days.

(21) Appl. No.: 12/057,426

(22) Filed: Mar. 28, 2008

(65) Prior Publication Data

US 2008/0267072 A1    Oct. 30, 2008

Related U.S. Application Data

(60) Provisional application No. 60/914,432, filed on Apr. 27, 2007, provisional application No. 60/970,428, filed on Sep. 6, 2007.

(51) Int. Cl.
*G01R 31/08* (2006.01)
*G06F 11/00* (2006.01)
*H04L 12/28* (2006.01)
*H04L 12/56* (2006.01)

(52) U.S. Cl. ............... 370/236.2; 370/241.1; 370/395.3
(58) Field of Classification Search ............... None
See application file for complete search history.

(56) References Cited

U.S. PATENT DOCUMENTS

| 5,781,716 A | 7/1998 | Hemphill et al. |
| 6,301,239 B1 | 10/2001 | Chuprun et al. |
| 6,636,499 B1 | 10/2003 | Dowling |
| 7,151,773 B1 | 12/2006 | Mo et al. |
| 7,301,949 B2 * | 11/2007 | Eriksson ............... 370/392 |
| 7,512,139 B2 | 3/2009 | Wong et al. |
| 7,606,143 B2 * | 10/2009 | Cooley et al. ............... 370/218 |
| 7,706,362 B1 | 4/2010 | Senthilnathan et al. |
| 2002/0001302 A1 | 1/2002 | Pickett |
| 2003/0235214 A1 * | 12/2003 | Leroux et al. ............... 370/504 |

(Continued)

FOREIGN PATENT DOCUMENTS

CN    1571377    1/2005

(Continued)

OTHER PUBLICATIONS

Bottorf, Paul, et al., "Provider Backbone Transport Overview", http://www.ieee802.org/1/files/public/docs2006/new-bottorff-pbt-overview-1006-01.pdf, Nov. 26, 2006, 5 pages.

(Continued)

*Primary Examiner* — Chirag G Shah
*Assistant Examiner* — Ashley L Shivers
(74) *Attorney, Agent, or Firm* — Conley Rose, P.C.; Grant Rodolph

(57) ABSTRACT

A communications network comprising a plurality of nodes supporting connection-oriented traffic and connectionless traffic, wherein management traffic between the nodes is propagated as connectionless traffic having a common management identifier. Also disclosed is a communications network component comprising logic that supports connection-oriented traffic and Virtual Local Area Network (VLAN)-based connectionless traffic, wherein the logic propagates management messages as VLAN-based connectionless traffic having a unique VLAN identifier (VID). Included is a communications network component comprising at least one processor configured to implement a method comprising provisioning a unique VID for management messages, and selectively propagating management messages with the unique VID.

20 Claims, 3 Drawing Sheets

U.S. PATENT DOCUMENTS

| | | | |
|---|---|---|---|
| 2004/0044754 A1 | 3/2004 | Virdy et al. | |
| 2004/0218542 A1 | 11/2004 | Lee | |
| 2004/0255154 A1* | 12/2004 | Kwan et al. | 713/201 |
| 2005/0013297 A1 | 1/2005 | Eriksson | |
| 2005/0018612 A1 | 1/2005 | Fitzgerald | |
| 2005/0064906 A1 | 3/2005 | Metzler et al. | |
| 2005/0097206 A1* | 5/2005 | Rabinovitch et al. | 709/224 |
| 2005/0099949 A1* | 5/2005 | Mohan et al. | 370/236.2 |
| 2005/0108401 A1* | 5/2005 | Gonda | 709/227 |
| 2005/0220096 A1* | 10/2005 | Friskney et al. | 370/389 |
| 2006/0034292 A1* | 2/2006 | Wakayama et al. | 370/395.5 |
| 2006/0239183 A1* | 10/2006 | Robitaille et al. | 370/217 |
| 2007/0086455 A1 | 4/2007 | Allan et al. | |
| 2007/0133397 A1 | 6/2007 | Bianchi et al. | |
| 2007/0263660 A1* | 11/2007 | Mitsumori | 370/469 |
| 2008/0049621 A1* | 2/2008 | McGuire et al. | 370/236.2 |
| 2008/0065775 A1 | 3/2008 | Polk | |
| 2008/0101241 A1* | 5/2008 | Mohan et al. | 370/236.2 |
| 2008/0107027 A1* | 5/2008 | Allan et al. | 370/235 |
| 2008/0112331 A1 | 5/2008 | Long et al. | |
| 2008/0253299 A1 | 10/2008 | Damm et al. | |
| 2008/0270588 A1 | 10/2008 | Sultan et al. | |
| 2008/0291922 A1 | 11/2008 | Sultan et al. | |

FOREIGN PATENT DOCUMENTS

| | | |
|---|---|---|
| CN | 1728658 | 2/2006 |
| CN | 1741480 | 3/2006 |
| CN | 1823505 | 8/2006 |
| CN | 101179479 | 5/2008 |
| WO | 9856140 | 12/1998 |

OTHER PUBLICATIONS

Vissers, Maarten, "CFM in PBB-TE", http://www.ieee802.org/1/files/public/docs2007/new-vissers-cfm-in-pbb-te-0307.pdf, Mar. 2007, 18 pages.

IEEE P802.1AX™/D2.1, "Draft Standard for Local and Metropolitan Area Networks Link Aggregation", IEEE Computer Society, Feb. 23, 2008, 155 pages.

IEEE Standard, 802.1Q™, "IEEE Standard for Local and Metropolitan Area Networks, Virtual Bridged Local Area Networks", IEEE Computer Society, May 19, 2006, 301 pages.

IEEE, 802.1Qay/D3.0, "Virtual Bridged Local Area Networks—Amendment: Provider Backbone Bridge Traffic Engineering", IEEE Computer Society, Apr. 18, 2008, 144 pages.

IEEE Standard, 802.1ad™, "IEEE Standard for Local and Metropolitan Area Networks, Virtual Bridged Local Area Networks, Amendment 4: Provider Bridges", IEEE Computer Society, May 26, 2006, 73 pages.

IEEE Standard, 802.1D™, "IEEE Standard for Local and Metropolitan Area Networks, Media Access Control (MAC) Bridges", IEEE Computer Society, Jun. 9, 2004, 260 pages.

IEEE Standard, 802.1ag™, "IEEE Standard for Local and Metropolitan Area Networks, Virtual Bridged Local Area Networks, Amendment 5: Connectivity Fault Management", IEEE Computer Society, Dec. 17, 2007, 260 pages.

IEEE P802.1ah/D3.4, "Draft Standard for Local and Metropolitan Area Networks, Virtual Bridged Local Area Networks, Amendment 6: Provider Backbone Bridges", IEEE Computer Society, Mar. 10, 2007, 195 pages.

IEEE P802.1ah/D4.2, "Draft Standard for Local and Metropolitan Area Networks, Virtual Bridged Local Area Networks, Amendment 6: Provider Backbone Bridges", IEEE Computer Society, Mar. 26, 2008, 116 pages.

IEEE P802.1ag/D8, "Draft Standard for Local and Metropolitan Area Networks, Virtual Bridged Local Area Networks—Amendment 5: Connectivity Fault Management", IEEE Computer Society, Feb. 8, 2007, 248 pages.

International Telecommunication Union, ITU-T, G.7712/Y.1703, Telecommunication Standardization Sector of ITU, "Series G: Transmission Systems and Media, Digital Systems and Networks, Digital Terminal Equipments—Operations, Administration and Maintenance Features of Transmission Equipment, Series Y: Global Information Infrastructure and Internet Protocol Aspects", Mar. 2003, 78 pages.

Sultan, Robert, et al., "Method of Detecting Transport Leaks in Hybrid Switching Networks", filed Mar. 27, 2007 as U.S. Appl. No. 11/691,558.

Sultan, Robert, et al., "Fault Verification for an Unpaired Unidirectional Switched-Path", filed Mar. 27, 2008 as U.S. Appl. No. 12/056,405.

Sultan, Robert, et al., "System for Connectivity Fault Management in Networks Supporting Both Connectionless and Connection-Oriented Traffic", filed Apr. 27, 2007 as U.S. Appl. No. 60/914,432.

Sultan, Robert, et al., "Verifying Management Virtual Local Are Network Identifier Provisioning Consistency", filed Mar. 28, 2008 as U.S. Appl. No. 12/057,566.

Foreign Communication From a Related Counterpart Application—International Search Report, PCT/CN2008/070779, Dated Jul. 31, 2008; 2 pages.

Foreign Communication From a Related Counterpart Application—International Preliminary Report on Patentability, PCT/CN2008/070779, Dated Oct. 27, 2009; 5 pages.

IEEE Standard, 802.1ab™, "IEEE Standard for Local and Metropolitan Area Networks, Station and Media Access Control Connectivity Discovery," IEEE Computer Society, May 6, 2005, 172 pages.

IEEE P802.1ah/D3.4, "Draft Standard for Local and Metropolitan Area Networks, Virtual Bridged Local Area Networks, Amendment 6: Provider Backbone Bridges", IEEE Computer Society, Mar. 10, 2007, 195 pages.

Foreign communication from a related counterpart application—International Search Report and Written Opinion, PCT/CN2008/070773, Jul. 31, 2008, 9 pages.

Foreign Communication From a Related Counterpart Application—International Preliminary Report on Patentability, PCT/CN2008/070773, Oct. 27, 2009; 7 pages.

Office Action Dated Oct. 30, 2009, U.S. Appl. No. 12/056,405, 28 pages.

Office Action Dated Apr. 27, 2010, U.S. Appl. No. 12/056,405, 23 pages.

Office Action dated Sep. 15, 2010, U.S. Appl. No. 12/056,405, 35 pages.

Office action dated May 5, 2010, U.S. Appl. No. 12/057,566, 10 pages.

Office action dated Sep. 13, 2010, U.S. Appl. No. 12/057,566, 16 pages.

Office Action dated Sep. 13, 2010, U.S. Appl. No. 12/057,566, 10 pages.

Office Action dated Oct. 13, 2010, U.S. Appl. No. 12/057,566, 12 pages.

* cited by examiner

US 7,969,888 B2

DATA COMMUNICATIONS NETWORK FOR THE MANAGEMENT OF AN ETHERNET TRANSPORT NETWORK

CROSS-REFERENCE TO RELATED APPLICATIONS

The present application claims priority to U.S. Provisional Patent Application Ser. No. 60/914,432 filed Apr. 27, 2007 by Sultan et al. and entitled "System for Performing Connectivity Fault Management in Networks Supporting Both Connectionless and Connection-Oriented Traffic." The present application also claims priority to U.S. Provisional Patent Application Ser. No. 60/970,428 filed Sep. 6, 2007 by Sultan et al. and entitled "Data Communications Network for the Management of an Ethernet Transport Network." These provisional applications are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through the network. The nodes may include routers, switches, and/or bridges that transport the individual data frames and/or packets through the network. Some networks support both connectionless frame transfer (e.g., Provider Backbone Bridging (PBB)) and connection-oriented frame transfer (e.g., PBB Traffic Engineering (PBB-TE)). Providing management services (e.g., Data Communication Network services and/or connectivity fault management) in such networks is desirable.

SUMMARY

In a first aspect, the disclosure includes a communications network comprising a plurality of nodes supporting connection-oriented traffic and connectionless traffic, wherein management traffic between the nodes is propagated as connectionless traffic having a common management identifier.

In a second aspect, the disclosure includes a communications network component comprising logic that supports connection-oriented traffic and Virtual Local Area Network (VLAN)-based connectionless traffic, wherein the logic propagates management messages as VLAN-based connectionless traffic having a unique VLAN identifier (VID).

In a third aspect, the disclosure includes a communications network component comprising at least one processor configured to implement a method comprising provisioning a unique VID for management messages, and selectively propagating management messages with the unique VID.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their fall scope of equivalents.

As described herein, embodiments of the disclosure involve propagating management messages or traffic in a hybrid networking system that supports connection-oriented traffic and connectionless traffic (e.g., traffic based on VLANs). In some embodiments, connection-oriented frame transfers are based on PBB-TE and connectionless frame transfers are based on PBB. In such hybrid network systems, management messages can be propagated as connectionless traffic having a unique management identifier. The management messages may correspond to DCN services or other management services.

Figure 1:
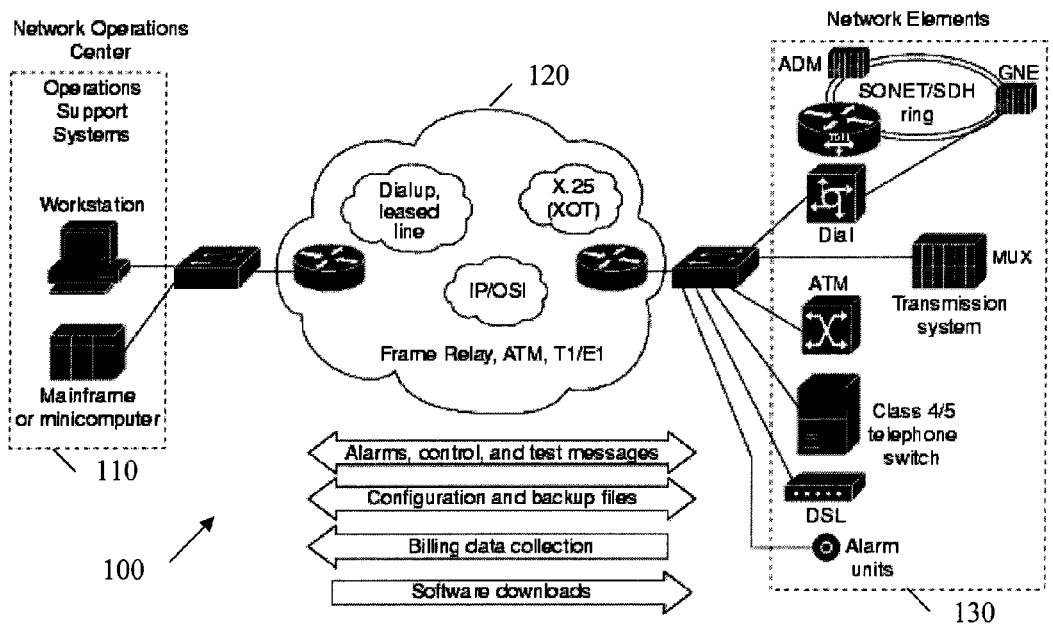
FIG. 1 is a block diagram of a system with a Data Communications Network (DCN).

FIG. 1 is a block diagram of an embodiment of a system 100 with a DCN 120. FIG. 1 is provided to better understand the use of the term DCN in the disclosure. In FIG. 1, a telecommunications service provider may deploy network elements 130 such as Synchronous Optical Network (SONET) or Synchronous Digital Hierarchy (SDH) components. The DCN 120 is deployed to support management connectivity between an Operations Support System (OSS) 110 and individual network elements 130, which comprise a Transport Network. The DCN 120 (e.g., International Telecommunication Union Standardization Sector (ITU-T) G.7712/Y.1703) makes it unnecessary to provide direct connections between the OSS 110 and each individual network element 130 of the transport network. The DCN 120 requires the deployment of a routing protocol such as Open Systems Interconnect (OSI) routing or Internet Protocol (IP) routing in the network elements 130. Information carried by the DCN 120 includes Operation, Administration, Management, and Provisioning (OAM&P) messages, configuration and backup files, billing data, and software downloads. In some embodiments, the DCN may be called a Communications Management Network or a Management network. In other embodiments, the DCN VLAN may be called a Management VLAN, a Network Management VLAN, a Network Management System (NMS) VLAN, or a Communications Network Management (CNM) VLAN.

In at least some embodiments, an instance of a bridged VLAN supports connectivity between a NMS and the bridging devices associated with an Ethernet Transport Network (Institute of Electrical and Electronic Engineers (IEEE) Draft Std. 802.1Qay). The role of the VLAN with respect to the Ethernet Transport network is similar to the role of the DCN (ITU-T G.7712/Y.1703) 120 in a traditional (e.g., SONET/SDH) telecommunications network. The VLAN used for this purpose may be called an Ethernet DCN.

Embodiments provide an efficient method of interconnecting a NMS with Ethernet Transport Devices (802.1Qay compliant bridges) because it is unnecessary to provide a direct connection between the NMS and each individual Ethernet Transport Device. This is similar to the efficiency provided by a DCN in a SONET network. A particular advantage of using a VLAN for this purpose is that the 802.1Qay bridge natively supports VLANs. This makes it unnecessary to introduce additional protocols to the 802.1Qay bridge in order to support the DCN function.

Figure 2:
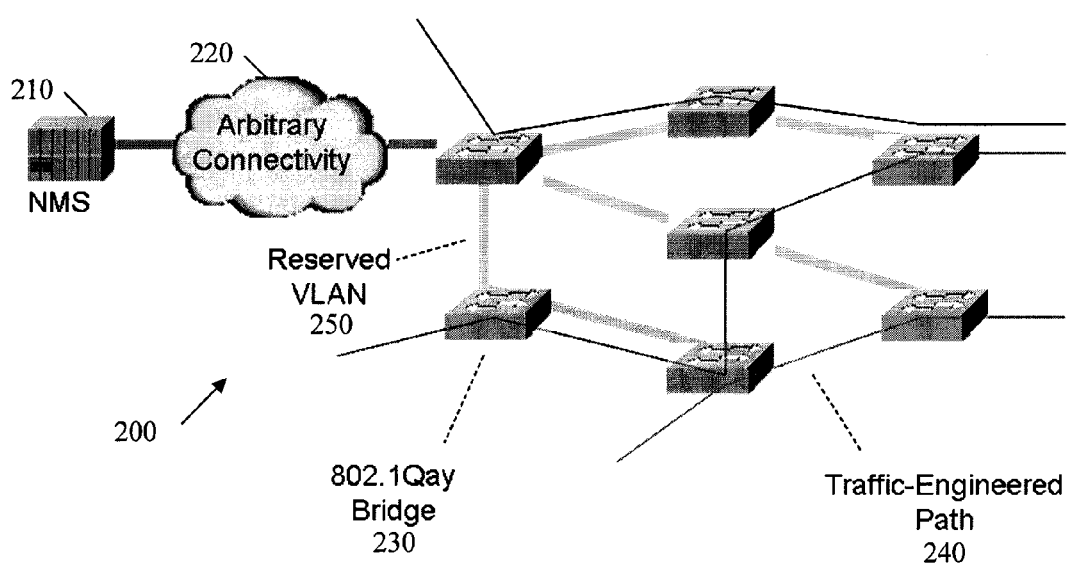
FIG. 2 is a block diagram of an embodiment of an Ethernet Transport Network managed via an Ethernet DCN.

FIG. 2 is a block diagram of an embodiment of an Ethernet Transport Network (ETN) 200 managed using a reserved VLAN 250 that acts as an Ethernet DCN. In at least some embodiments, the ETN 200 follows the IEEE Draft Std. 802.1Qay protocol, which specifies the means by which VLAN Bridges 230 may be used to support traffic-engineered paths. A network deploying such paths can transport data in a manner similar to a SONET or SDH network. In FIG. 2, the ETN 200 is managed by a NMS 210 in a manner similar to the way in which a SONET-based transport network is managed by the OSS 110. As in the case of the SONET-based transport network, it is useful to avoid the direct interconnection between the NMS 210 and each bridging device 230 within the ETN 200. It is observed that an 802.1Qay-compliant device 230 can concurrently support instances of VLANs and instances of traffic-engineered paths 240. Thus, DCN-type services in the ETN 200 are provided using the reserved VLAN 250, which interconnects the NMS 210 with ETN devices 230. In this manner, direct connection of the NMS 210 with each individual device 230 is unnecessary and an additional network technology need not be introduced to support the Ethernet DCN. This can be contrasted with the use of a traditional DCN 120, which requires the introduction of a layer-3 protocol, such as OSI routing or IP routing in the network elements 130.

In general, the reserved VLAN 250 of the ETN 200 can be used to carry the same types of information as the traditional DCN, which includes OAM&P (such as alarm, control, and test messages), configuration and backup files, billing data, and software downloads. In addition, the reserved VLAN 250 is useful in carrying Connectivity Fault Management (CFM) information related to traffic-engineered Ethernet paths. For additional information regarding CFM services in hybrid communication networks, reference may be had to U.S. patent application Ser. No. 12/056,405 filed Mar. 27, 2008 by Sultan et al. and entitled "Fault Verification for an Unpaired Unidirectional Switched-Path" and to U.S. Provisional Patent Application Ser. No. 60/914,432 filed Apr. 27, 2007 by Sultan et al. and entitled "System for Performing Connectivity Fault Management in Networks Supporting Both Connectionless and Connection-Oriented Traffic", which are herein incorporated by reference as if reproduced in their entirety.

The reserved VLAN 250 enables connectivity among all nodes/bridges in the entire ETN 200. The PBB-TE protocol requires all network connectivity paths to be explicitly created (instead of spanning tree). For a network with only PBB-TE paths, intermediate nodes along PBB-TE paths cannot reach each other. By creating an Ethernet DCN, each node/bridge in the PBB-TE network is reachable from every other node/bridge in the network. In such case, various management functions can be supported. For example, the Ethernet DCN can support remote access from any PBB-TE nodes to other PBB-TE nodes. In this manner, an operator at one location can remotely login to another node to perform OAM&P functions. Additionally or alternatively, the reserved VLAN 250 supports segment connectivity testing or other diagnostic operations. As an example, any intermediate node can test its connectivity to other nodes along ESP paths. Using such connectivity testing faults can be isolated along any PBB-TE segment.

Figure 3:
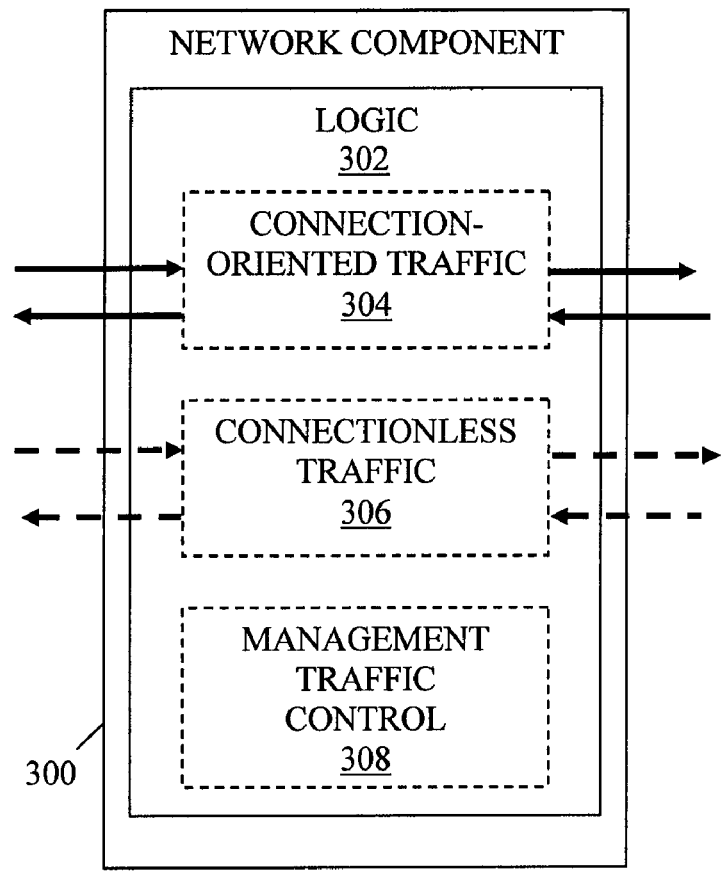
FIG. 3 is a block diagram of an embodiment of a network component.

FIG. 3 is a block diagram of an embodiment of a network component 300. For example, the network component 300 may be representative of an 802.1Qay bridge as described for FIG. 2. In FIG. 3, the network component 300 comprises logic 302 that supports various functions. The logic 302 may be representative of hardware, firmware, and/or software modules as understood by those of skill in the art. As shown, the logic 302 comprises a connection-oriented traffic module 304 that supports connection-oriented traffic (represented by the solid arrows). The logic 302 also comprises a connectionless traffic module 306 that supports VLAN-based communications (represented by the dashed arrows). Finally, the logic 302 comprises a management traffic control module 308 that enables the network component 300 to generate and/or to handle management traffic.

For example, in some embodiments, the management traffic control module 308 enables the network component 300 to generate messages relate to Loopback, Linktrace, and/or Connectivity Check operations. It further supports the connection-oriented Probe Request Message (PBM) and the connectionless Probe Response Message (PBR) as described within U.S. patent application Ser. No. 12/056,405 filed Mar. 27, 2008 by Sultan et al. and entitled "Fault Verification for an Unpaired Unidirectional Switched-Path", which is incorporated herein by reference as if reproduced in its entirety. Additionally or alternatively, the management traffic control module 308 enables the network component 300 to generate OAM&P messages, configuration, and backup files, billing data, software downloads, or other management traffic as connectionless traffic. Additionally or alternatively, the management traffic control module 308 enables the network component 300 to respond to incoming management traffic. Regardless of the management traffic type and/or source, a management VID is associated with the management traffic. The management VID corresponds to the reserved VLAN 250 and Ethernet DCN discussed previously with respect to FIG. 2. The management VID may be temporarily provisioned or globally reserved.

Figure 4:
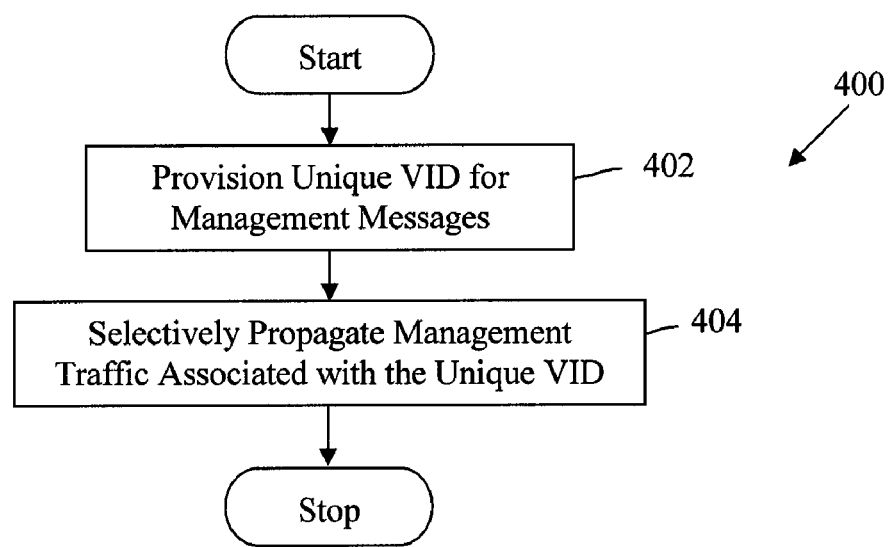
FIG. 4 is a flowchart of an embodiment of a management method.

FIG. 4 is a flowchart of an embodiment of a management method 400. As shown, the method 400 starts by provisioning a unique VID for management messages (block 402). For example, the unique VID may be temporarily provisioned or globally reserved as a management VID. At block 404, management traffic associated with the unique VID is selectively propagated. Steps 402 and 404 can be performed by a single device or by multiple devices of a communications network. In some embodiments, the method 400 further comprises steps such as generating and/or responding to management traffic using the unique VID. As an example, the method 400 enables a network operator to perform DCN functions in an Ethernet network.

Figure 5:
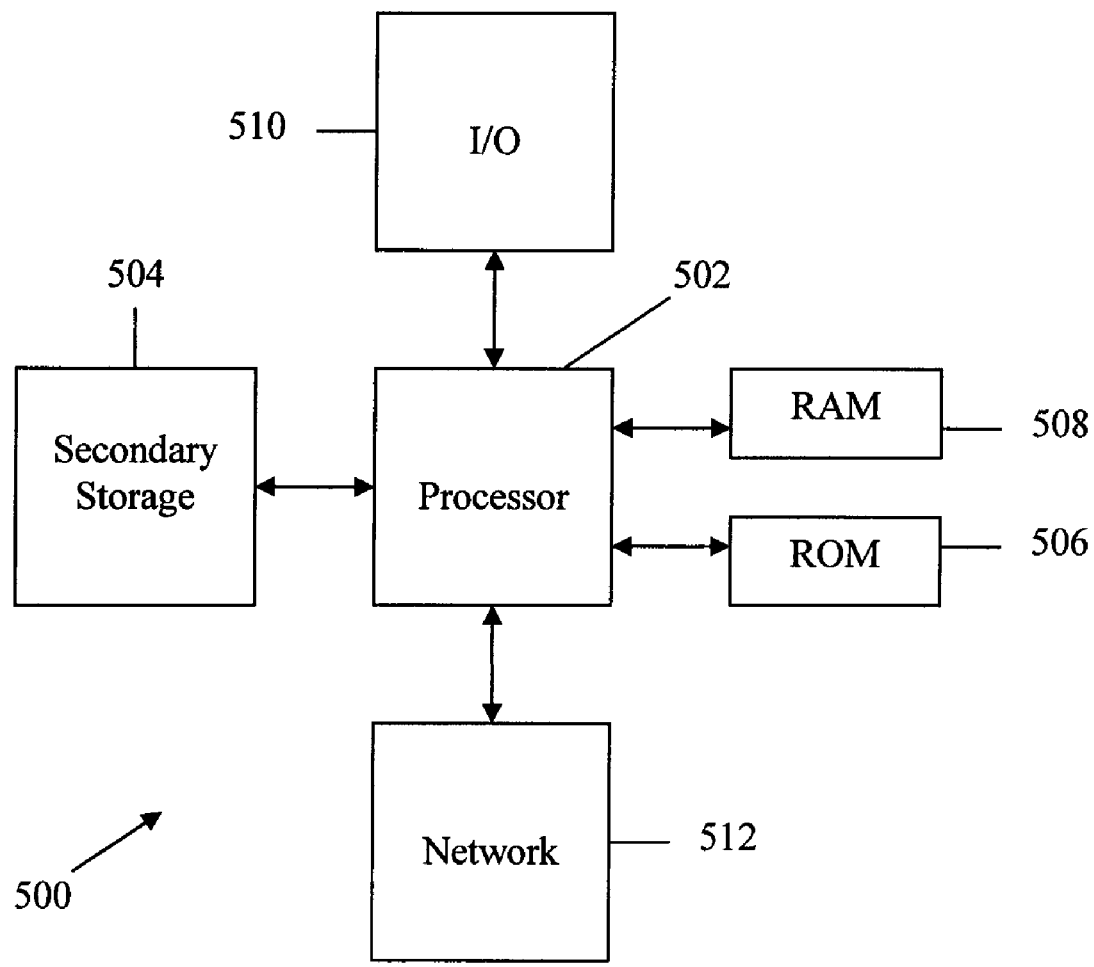
FIG. 5 is a block diagram of an embodiment of a general-purpose network component.

The components and methods described above may be implemented on any general-purpose network component, such as a computer, router, switch, or bridge, with sufficient processing power, memory resources, and network throughput capability to handle the necessary workload placed upon it. FIG. 5 illustrates a typical, general-purpose network component suitable for implementing one or more embodiments of a node disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor may be implemented as one or more CPU chips.

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A communications network comprising:
    a plurality of nodes supporting Ethernet connection-oriented traffic that takes a predefined path through the network that has a first Virtual Local Area Network (VLAN) identifier (VID), and Ethernet connectionless traffic, that is not associated with the predefined path through the network and has a second VID,
    wherein the nodes generate management traffic for the predefined path, and
    wherein the management traffic for the predefined path is propagated as connectionless traffic having the second VID.

2. The communications network of claim 1, wherein the Ethernet connectionless traffic is based on an Ethernet (VLAN) protocol, and wherein the connection-oriented traffic is based on Provider Backbone Bridge Traffic Engineering.

3. The communications network of claim 1, wherein the nodes are Provider Backbone Bridge Traffic Engineering compatible.

4. The communications network of claim 1, wherein the management traffic comprises Operation, Administration, Management, and Provisioning messages.

5. The communications network of claim 1 further comprising a network management system (NMS), wherein less than all of the nodes are coupled to the NMS via other predefined connection-oriented paths.

6. The communications network of claim 1, wherein the second VID comprises a temporarily provisioned VID.

7. The communications network of claim 1, wherein the second VID comprises a globally reserved VID.

8. The communications network of claim 1, wherein the management traffic for the predefined path involves remote login and remote management for a first node from a second node.

9. The communications network of claim 1, wherein the management traffic for the predefined path involves connectivity diagnostic operations for the predetermined path.

10. The communications network of claim 1, wherein the nodes are part of an Ethernet Transport Network managed via an Ethernet Data Communications Network.

11. A communications network component having at least one processor comprising:
    logic running on a processor that supports connection-oriented traffic associated with a predefined connection-oriented path, wherein the connection-oriented traffic has a first VLAN identifier (VID), and supports Virtual Local Area Network (VLAN)-based connectionless traffic that is not associated with the predefined connection-oriented path, and wherein the VLAN-based connectionless traffic has a second VID; and
    a management traffic control module running on the processor comprising the logic that sends management messages for the predefined connection-oriented path as VLAN-based connectionless traffic having the second VID.

12. The communications network component of claim 11, wherein the logic of the management traffic control module selectively generates Operation, Administration, Management, and Provisioning messages for propagation as a management message.

13. The communications network component of claim 11, wherein the logic of the management traffic control module selectively generates at least one of configuration files, backup files, billing data, and software downloads for propagation as a management message.

14. The communications network component of claim 11, wherein the logic of the management traffic control module stores the second VID as a temporarily provisioned or globally reserved identifier for management messages.

15. The communications network component of claim 11, wherein the logic of the management traffic control module supports remote login and remote management of another component by the communications network component based on the second VID.

16. The communications network component of claim 11, wherein the logic of the management traffic control module supports remote login and remote management of the communications network component by another component based on the second VID.

17. The communications network component of claim 11, wherein the logic of the management traffic control module selectively generates connectivity diagnostic operations for the connection-oriented communication path based on the second VID.

18. A communications network component comprising:
    at least one processor configured to:
        establish a connection-oriented provider backbone bridge traffic engineering (PBB-TE) path;

provision a plurality of connectionless Virtual Local Area Networks (VLANs);
provision a first VLAN identifier (VID) for connection-oriented traffic propagated over the connection-oriented PBB-TE path; and
provision a second VID for connectionless traffic not propagated over the connection-oriented PBB-TE path; and a network connectivity device configured to:
selectively propagate management messages associated with the PBB-TE path as connectionless traffic comprising the second VID, wherein the management messages are not propagated as connection-oriented traffic over the PBB-TE path.

19. The component of claim 18, wherein the processor is further configured to recognize incoming management messages as valid based on the second VID.

20. The component of claim 18, wherein the management messages comprise at least one of Operation, Administration, Management, and Provisioning messages, remote login messages, and connectivity testing messages.

* * * * *

UNITED STATES PATENT AND TRADEMARK OFFICE
CERTIFICATE OF CORRECTION

| | | |
|---|---|---|
| PATENT NO. | : 7,969,888 B2 | |
| APPLICATION NO. | : 12/057426 | |
| DATED | : June 28, 2011 | |
| INVENTOR(S) | : Robert Sultan et al. | |

It is certified that error appears in the above-identified patent and that said Letters Patent is hereby corrected as shown below:

Column 6, line 13, claim 9, replace the last two words -predetermined path- with "predefined path".

Signed and Sealed this
Ninth Day of August, 2011

David J. Kappos
*Director of the United States Patent and Trademark Office*